June 4, 1929.   R. E. B. SHARP   1,716,328
ADJUSTABLE VANE RUNNER
Filed Aug. 10, 1926   2 Sheets-Sheet 1
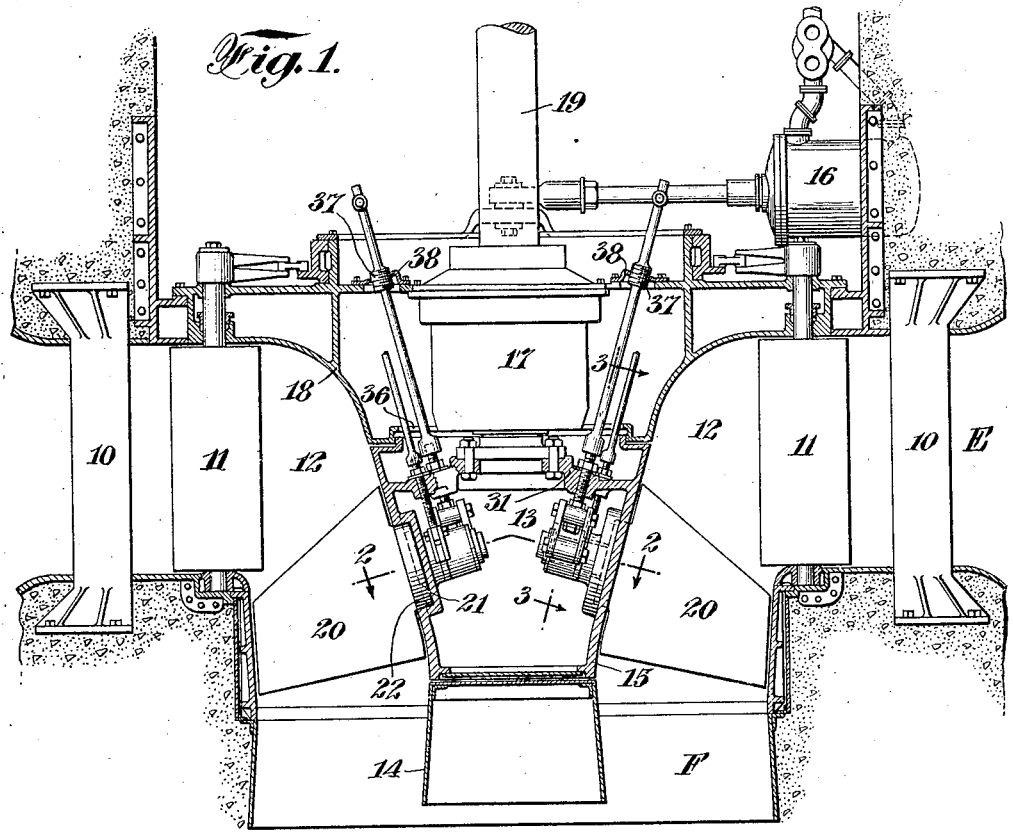
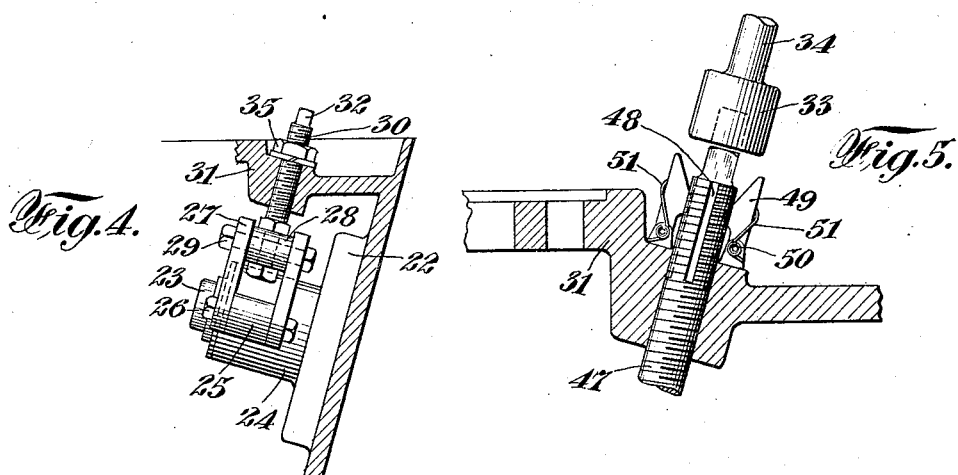
Inventor
Robert E. B. Sharp
By his Attorneys

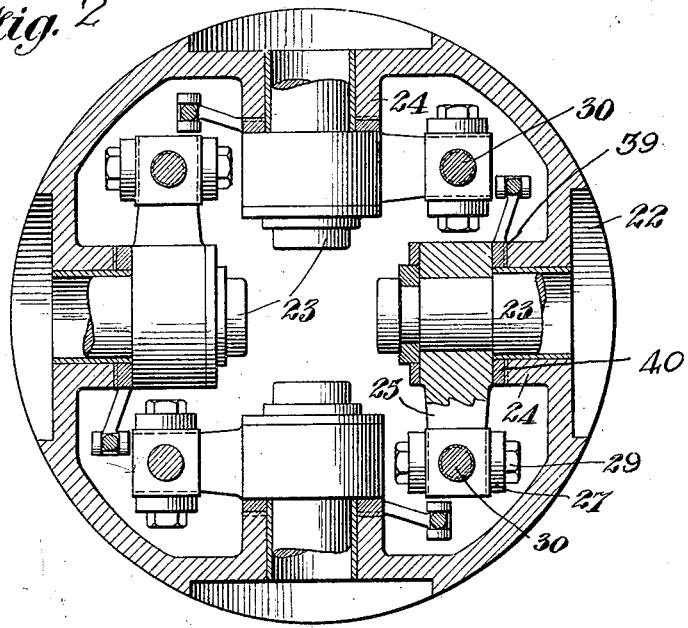
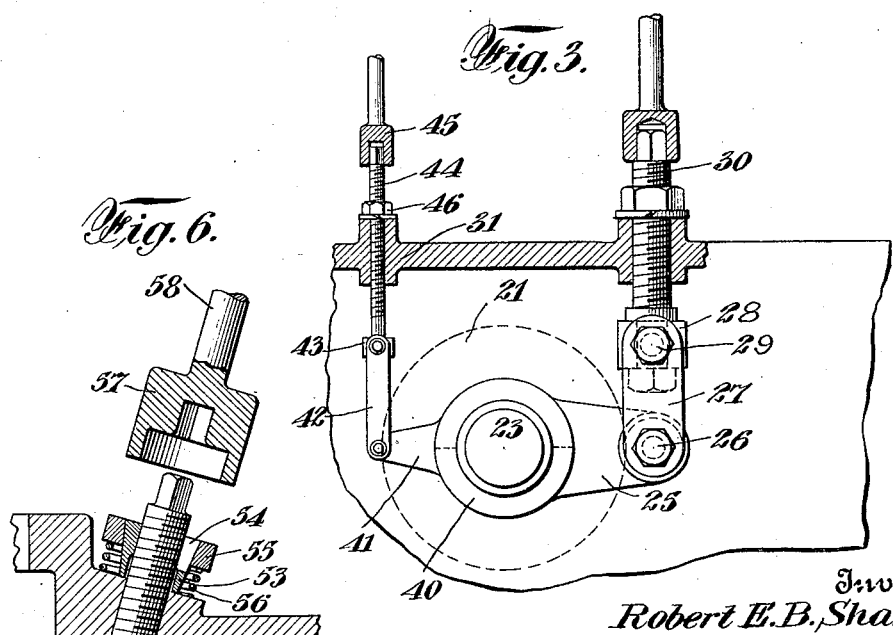

Patented June 4, 1929.

1,716,328

UNITED STATES PATENT OFFICE.

ROBERT EDWARD BRUNSWICK SHARP, OF PHILADELPHIA, PENNSYLVANIA, ASSIGNOR TO I. P. MORRIS CORPORATION, A CORPORATION OF DELAWARE.

ADJUSTABLE VANE RUNNER.

Application filed August 10, 1926. Serial No. 128,356.

This invention relates to hydraulic turbines and particularly to turbines of the reaction type provided with propeller type runners of high specific speed.

In turbines having high speed propeller type runners, high efficiencies can be attained, under a given condition of head and load, but it is characteristic of such high speed machines having fixed runner blades that high part gate efficiencies cannot be obtained and but little overload capacity can be secured beyond the point of maximum efficiency. The limitation in over-load capacity is particularly disadvantageous during times of operation under reduced head. Moreover, in some plants a seasonal variation in the available water quantity may make it desirable to shift the point of high efficiency to lower or higher loads. It therefore becomes desirable to provide means for altering the runner characteristics in order to secure greater overload capacity, greater capacity under reduced head or improved efficiency when the operating conditions are altered.

The object of this invention is to provide a turbine in which high efficiency may be maintained at reduced loads or overloads, in which the overload capacity may be increased during a reduction in head, and in which the turbine characteristics may be made flexible by means of an adjustment of the angular position of the runner blades. Another object of the invention is to provide means for altering the runner characteristics by adjustment of the runner blades without requiring the turbine to be unwatered or making it necessary to enter the turbine waterways. The alteration of the capacity and the maintenance of efficiency throughout a large range of performance is attained by providing the runner with blades of simple formation adapted to produce high specific speeds and having adjustment of the blades to a variable angle with relation to the flow.

Further objects and advantages of the invention, particularly the specific means used to attain these results, will be apparent from the following specification and drawings in which Fig. 1 is a sectional view of a vertical shaft turbine embodying the invention;

Fig. 2 is a sectional view on line 2—2 of Fig. 1;

Fig. 3 is a sectional view on line 3—3 of Fig. 1;

Fig. 4 is an enlarged sectional view of a portion of Fig. 1 showing the mechanism for adjusting the runner blades;

Fig. 5 is a sectional view of a modified locking means for the actuating screw rod of the blades, and Fig. 6 is a further modification of a locking means for the screw rod of the blades.

In the specific embodiment of the invention shown, a turbine of vertical shaft type comprises a water discharge curving from a radially directed entrance E to the expanding draft tube F. The entrance of the radial inflow is provided with inflow guide vanes which may be fixed, adjustable or both. The flow has a radial entrance from the stay vanes 10 and adjustable guide vanes 11, with an intermediate transition space 12 between the guide vanes and the runner 13, wherein the flow turns toward axial direction. In the embodiment of the invention shown both movable runner blades and movable guide vanes are used, and can be so arranged and their operating mechanisms so interconnected that very little drop in efficiency will be secured over a wide range of performance, the discharge of the runner under a wide range of conditions remaining nearly axial in direction and with but little whirl. If, however, a draft tube of the spreading type or other equivalent type is used capable of regaining the energy of whirl contained in the water discharge from the runner it is then of less importance to provide movable guide vanes in addition to movable runner blades, since the draft tube can handle whirling water and can efficiently reconvert the energy of the whirl into useful pressure head. In general, it is recognized to use this turbine with whirl regaining draft tubes and to provide a central core 14 in the draft tube extending up to and conforming with the runner hub 15. In some smaller installations it will probably be desired to omit the draft tube cone 14 for reasons of first cost.

The bearing casing 17 contains the bearing proper and is mounted in the head cover 18. The runner 13 is of the movable blade type rotated by a vertical shaft 19. The regulation of the blade is performed by the rotation of each blade 20 and on an axis contained in the meridian plane, that is, the plane containing the turbine axis. The blades have hubs 21 mounted to rotate in bearings 22 of the runner hub. Each blade is provided with a blade stem 23 mounted in bearings 24 extending from the blade hub carrying an arm 25 connected by bolt 26 to links 27, which are connected to block 28 by bolt 29 to provide a swivel connection with the screw rod 30 passing upward within the runner hub and screw threaded to inwardly extending ring 31 of the runner hub. The screw rod is provided at its lower end with a bearing rotating in block 28 and at its upper end with a head 32 for connection with socket wrenches 34. A nut and lock washer 35 on the screw rod bearing against the ring 31 locks the screw rod in non-rotating position. It will be readily seen that by rotating the screw rod 30 the runner blade is rotated on its stem, thus changing its angle. A relatively small amount of angular adjustment of the blades is all that is needed in order to change the runner characteristics to suit the usual range desired in operation and to reduce the load to zero. A relatively small amount of angular adjustment would also adjust the blades beyond the zero position in order to reverse the direction of rotation of the turbine with respect to the direction of the flow therethrough.

Openings 36 in the lower walls of the head cover provide means for inserting the socket wrenches into the hub of the runner, which rotate the screw rods of the blades to change their blade angle. The socket wrenches may be provided with enlargements 37 fitting openings in a guide plate 38 attached to the upper wall of the head cover. These enlargements are graduated to indicate the exact position of the runner blades, as in order to adjust the blades the runner must be at rest so that the screw rod 30 registers with the openings 36 and 38. Gauge marks on the runner shaft can be used to indicate the proper position of the runner while at rest. This gauging operation may be performed by a turn buckle gear attached to the generator rotor or by special jacks. The enlargements 37 can be screw threaded into the openings 38 and the socket wrenches permanently installed in the cover head are merely backed off to clear the runner when the turbine is in operation.

If the screw rod is secured in non-rotating position there is a tendency for lost motion and wear between it and its connection with the runner blade. Thus the blade is not rigidly secured to the runner hub, which is necessary for proper efficiency and smooth operation. In order to overcome this lost motion the blades are wedged laterally in their bearings 24.

The bearing 24 is provided with a wedging surface 39 which cooperates with wedge 40 mounted for rotation on the stem 23 between the bearing and the arm 25. The wedge 40 carries an arm 41 connected by links 42 to a block member 43 having a swivel joint with a screw rod 44 which is screw threaded to ring 31 for operating the wedge. Screw rod 44 is operated by socket wrench 45 which is operated through apertures in the head cover similar to the operation of socket wrenches 34. A nut and lock washer 46 is adapted to lock the screw rod in position.

Figs. 5 and 6 show modified locking means for the screw rod which enables a single socket wrench to make the adjustment of the screw rod and upon removal of the wrench the screw rod will be automatically locked in position.

In Fig. 5 the screw rod 47 has a plurality of axial slots 48 adjacent the head end providing openings for the wedges 49 pivoted at 50 on the ring 31 of the runner hub. Coil springs 51 attached to the pivots and the wedges force the wedges into the slots 48. The head of the socket wrench upon being forced downwardly will spread the wedges against the action of the spring, freeing them from the slots 48, thus allowing the screw rod 47 to be rotated, and upon withdrawal of the socket wrench the wedges will snap back into the slots 48 to prevent rotation of the screw rod.

In Fig. 6 the screw rod 52 is prevented from rotating by means of cooperating collars 53 and 55. The collar 53 has a section of larger bore than the diameter of the screw rod and has extending therefrom a plurality of resilient screw threaded wedges 54 forced into contact with the screw rod by the surrounding collar which has a tapered bore cooperating with the wedge surfaces of the resilient wedges. The coiled spring 56 bearing against the collar 55 forces the collar upwardly and the wedges are pressed inwardly against the thread of the screw rod. The head 57 of the socket wrench 58, when adjustment is desired, will force the collar 55, against the action of spring 56, away from the wedges 54, which because of their resiliency will release their binding grip on the screw rod, permitting the same to be rotated. Upon removal of the socket wrench the wedges will be forced inwardly by spring pressed collar 55 to prevent rotation of the screw rod.

The turbine of this invention permits the structural parts to be very simple in form and at the same time combines high specific speed of the runner with a sustained efficiency at all loads. The adjustable runner blades absorb a variable amount of whirl from the flow depending upon the load, and it is therefore particularly advantageous with this type of runner to provide a draft tube capable of regaining the whirling components of the velocity, and converting them into effective pressure head at all loads. Such a draft tube adapted to spread and decelerate the flow between inner and outer surfaces of revolution is shown, and may be used to convert the variable whirl into pressure head and thus maintain the efficiency of the turbine throughout a wide variation in the load.

I claim:

1. In a hydraulic turbine the combination with a head cover of a runner having a hub portion and adjustable blades, means for adjusting said runner blades carried by said head cover and insertable within the runner hub when the runner is at rest.

2. In a hydraulic turbine the combination with a head cover of a runner having a hub portion and adjustable blades, means comprising wrenches carried by said head cover and insertable within the runner hub when the runner is at rest.

3. In a hydraulic turbine the combination with a head cover of a runner having a hub portion and adjustable blades, and means comprising wrenches carried by said head cover shiftable longitudinally and insertable within the runner hub when the runner is at rest.

4. In a hydraulic turbine the combination with a head cover of a runner having adjustable blades, means for adjusting and securing said runner blades carried by said runner within the runner hub, and means for operating said adjusting and securing means carried by said head cover and insertable within the runner hub when the runner is at rest.

5. In a hydraulic turbine the combination with a head cover of a runner having adjustable blades and means for adjusting said runner blades, and wedging means for forcing the blades against the runner hub, means for operating said adjusting means and wedging means carried by said head cover and insertable within the runner hub when the runner is at rest.

6. In a hydraulic turbine the combination with a head cover of a runner having adjustable blades, means for adjusting and locking said runner blades carried by said runner within the runner hub, and wrenches for operating said adjusting and locking means carried by said cover and insertable within the runner hub when the runner is at rest.

7. In a hydraulic turbine the combination with a head cover of a runner having adjustable blades, means for adjusting said runner blades, and wedging means for forcing the blades against the runner hub, and wrenches for operating said adjusting means and wedging means carried by said cover and insertable within the runner hub when the runner is at rest.

8. In a hydraulic turbine the combination with a head cover of a runner having a hub portion and adjustable blades, rotatable means carried by said hub for adjusting said blades, and wrenches insertable through said head cover to engage said rotatable means and thereby adjust the blades when the runner is at rest.

9. In a hydraulic turbine the combination with a head cover of a runner having a hub portion and adjustable blades, and wedging means for forcing the blades laterally against the runner hub, and wrenches carried by said head cover insertable within the runner hub for operating said adjustable blades and said wedging means when the runner is at rest.

10. In a hydraulic turbine the combination with guide vanes adapted to impart a whirl to the entering flow, of a runner having blades receiving said flow axially and with inward components, said blades being adjustable around axes inclined to the runner axis to different angles in relation to said flow, and a means for adjusting said runner blades, comprising wrench members and connections between said members and said blades.

11. In a hydraulic turbine the combination with guide vanes adapted to impart a whirl to the entering flow of a runner receiving said flow axially and with inward components, said blades being adjustable around axes inclined to the runner axis to different angles in relation to said flow, and means insertable within said hub for adjusting said blades while the runner is at rest.

12. In a turbine the combination with means for directing the flow against a runner with a whirl and combined radial and axial components, of a turbine runner comprising a hub portion and adjustable blades carried thereby, said blades being rotatably mounted in said hub around axes inclined to a plane perpendicular to the axis of the runner, and means insertable within said hub for adjusting said blades while the runner is at rest.

13. In a turbine the combination with means for directing the flow against a runner with a whirl and combined radial and axial components, of a turbine runner comprising a hub portion having a generally conical form and adjustable blades carried thereby, said blades being rotatably mounted in said hub around axes inclined to a plane perpendicular to the axis of the runner, and means insertable within said hub for adjusting said blades while the runner is at rest.

14. In a turbine the combination with means for directing the flow against a runner with a whirl and combined radial and axial components, of a turbine runner comprising a hub portion and adjustable blades carried thereby, said blades being rotatably mounted in said hub around axes inclined to a plane perpendicular to the axis of the runner, and means insertable within said hub for adjusting said blades while the runner is at rest, said runner blades being unshrouded.

15. In a turbine the combination with means for directing the flow against the runner with whirling and combined radial and axial velocity components, of a turbine runner comprising a hub portion and adjustable blades carried thereby, said blades being rotatably mounted in said hub around axes inclined to a plane perpendicular to the axis of the runner, means insertable within said hub for adjusting said blades, and means within said hub for wedging the blades in a lateral direction towards said hub.

16. In a turbine the combination with means for directing the flow against the runner with whirling and combined radial and axial velocity components, of a turbine runner comprising a hub portion and adjustable blades carried thereby, said blades being rotatably mounted in said hub around axes inclined to a plane perpendicular to the axis of the runner, means within said hub for adjusting said blades, means within said hub for wedging the blades in a lateral direction towards said hub, and wrench members insertable within said hub for operating said adjusting means and said wedging means.

17. In a hydraulic turbine the combination with a head cover of a runner having a hub portion and adjustable blades carried thereby, means disposed in said hub and adapted upon actuation to move said blades for adjustment thereof, and openings through said head cover providing access to said adjusting means only when said runner is at rest.

18. In a hydraulic turbine the combination with a head cover of an unshrouded runner of substantially axial flow type having a hub portion and adjustable blades carried thereby, and means disposed in said hub accessible through openings in the head cover and adapted upon actuation to move said blades for adjustment thereof only when the runner is at rest.

19. In a hydraulic turbine the combination with a head cover of a runner having a hub portion and adjustable blades carried thereby, means in said hub for adjusting said blades, and openings in said head cover and hub adapted to register with each other when the runner is at rest, providing access to said blade adjusting means.

20. In a hydraulic turbine the combination with a head cover of a runner having a hub portion and angularly adjustable blades, and individual blade adjusting means for providing a limited angular adjustment of the blades operable only when the runner is at rest.

21. In a hydraulic turbine the combination with a head cover of a runner having a hub portion and angularly adjustable blades, and individual blade adjusting means adapted when actuated to effect limited angular adjustment of the blades, said means being entirely enclosed within the runner hub.

22. In a hydraulic turbine the combination with a head cover of a runner having a hub portion and angularly adjustable blades, and individual blade adjusting means for providing a limited angular adjustment of the blades and being enclosed within the runner hub and operable from above the runner only when the runner is at rest.

23. In a hydraulic turbine the combination with a runner having a hub portion and adjustable blades, a surrounding wall for said runner providing a relatively small clearance space between the runner tips and said wall, operating means for adjusting said blades, and means disposed between the inner side of the hub wall and operating means for tightening said blades in said runner hub without materially changing said clearance space.

24. In a hydraulic turbine the combination with a runner having a hub portion and adjustable blades, a surrounding wall for said runner providing a relatively small clearance space between the runner tips and said wall, and wedging means for tightening said blades laterally in said runner hub without materially increasing said clearance space including an operating wedge separate from the blade structure.

25. In a hydraulic turbine the combination with a runner having a hub portion, and adjustable blades, means for adjusting and securing said runner blades carried by said runner within the runner hub operable only when the runner is at rest, said securing means including an actuated member having a wedging surface movable relative to the blade structure and being adapted to tighten the blades in the runner hub with a relatively slight lateral movement of said blades.

26. The combination in a hydraulic turbine comprising a high specific speed propeller type runner having a hub provided with bearings, runner blades rotatably adjustably supported in said bearings and each having a supporting shaft extending inwardly beyond the end of its bearing, each of said shafts having secured at its inner end an operating adjusting arm, and a wedging mechanism surrounding each of said shafts and interposed between its bearing and operating arm.

27. The combination in a hydraulic turbine comprising a high specific speed propeller type runner having a hub carrying rotatably adjustable blades, each of said blades having a shaft supported by and extending to the inner side of a bearing carried by said hub, each of said shafts having secured to its inner end within said hub an operating arm, and means for actuating each of said arms including a screw operatively connected with the runner hub whereby said arms may be actuated to effect adjustment of its blade.

28. The combination in a hydraulic turbine comprising a high specific speed propeller type runner having a hub provided with adjustable blades, means for supporting and controlling each of said blades, including a bearing in said hub, a blade shaft supported in said bearing and extending inwardly beyond the end thereof, an operating arm secured to the inner end of said shaft, and an operating member secured to said arm and adapted to be held against movement by the hub and to have movement relative thereto to effect actuation of said arm and corresponding adjustment of the blade.

29. The combination in a hydraulic turbine comprising a high specific speed propeller type runner having a hub provided with adjustable blades, means for supporting and controlling each of said blades, including a bearing in said hub, a blade shaft supported in said bearing and extending inwardly beyond the end thereof, an operating arm secured to the inner end of said shaft, and a screw having a threaded connection with said hub and an operative connection with said arm whereby upon actuation of said screw adjustment of the blade will be effected.

30. The combination in a hydraulic turbine comprising a high specific speed propeller type runner having a hub provided with adjustable blades, means for supporting and controlling each of said blades including a bearing in said hub, a blade shaft supported in said bearing extending inwardly beyond the end thereof, an operating arm secured to the inner end of said shaft, operating means for said arm, and means for tightly holding said blade in position after adjustment thereof including a wedge element which is rotated to effect its wedging action.

31. The combination in a hydraulic turbine comprising a high specific speed propeller type runner having a hub provided with adjustable blades, means for supporting and controlling each of said blades including a bearing in said hub, a blade shaft supported in said bearing and extending inwardly beyond the end thereof, an operating arm secured to the inner end of said shaft, operating means for said arm, and means for tightly holding said blade in position after adjustment thereof including a wedge element which is rotated to effect its wedging action, said wedging element being interposed between said bearing and arm.

32. The combination in a hydraulic turbine comprising a high specific speed propeller type runner having a hub provided with adjustable blades, means for supporting and controlling each of said blades including a bearing in said hub, a blade shaft supported in said bearing extending inwardly beyond the end thereof, an operating arm secured to the inner end of said shaft, operating means for said arm, and means for tightly holding said blade in position after adjustment thereof including a wedge element which is rotated to effect its wedging action, said rotatable wedge having an arm and actuating means therefor, including a member having operative connection with the runner hub, and adapted to be held in immovable relation thereto or to have movement relative thereto.

33. The combination in a hydraulic turbine comprising a high specific speed propeller type runner having a hub provided with adjustable blades, means for supporting and controlling each of said blades including a bearing in said hub, a blade shaft supported in said bearing and extending inwardly beyond the end thereof, an operating arm secured to the inner end of said shaft, operating means for said arm, and means for tightly holding said blade in position after adjustment thereof including a wedge element which is rotated to effect its wedging action, said rotatable wedge having an arm and operating means therefor, including a screw having threaded connection with said hub, whereby upon rotation of said screw said wedge is actuated.

34. The combination in a hydraulic turbine comprising a high specific speed propeller type runner having a hub provided with adjustable blades, means for supporting and controlling each of said blades including a bearing in said hub, a blade shaft supported in said bearing and extending inwardly beyond the end thereof, an operating arm secured to the inner end of said shaft, blade tightening mechanism including an element having an arm extending generally in the opposite direction to said shaft arm, and actuating members for each of said arms extending substantially in the same general direction, and each having operative connection with said hub.

35. The combination in a hydraulic turbine comprising a high specific speed propeller type runner having hub provided with adjustable blades, means for supporting and controlling each of said blades including a bearing in said hub, a blade shaft supported in said bearing extending inwardly beyond the end thereof, blade tightening mechanism including an element having an arm extending generally in the opposite direction to said shaft arm, and actuating members for each of said arms extending substantially in the same general direction, and each having operative connection with said hub, each of said actuating members comprising a screw having threaded connection with said hub.

36. The combination in a hydraulic turbine having inward flow guide vanes, a vane-free transition space and an unshrouded runner of high specific speed, said runner having a separate hub portion and angularly adjustable blade elements, means for adjusting said blades comprising an operating arm secured to each blade element and mechanism engaging each of said arms, said arms and mechanism being entirely enclosed within the hub; and said mechanism being adapted to be operable when the runner is at rest and having means rendering it incapable of being operated and stationary relatively to said hub when the runner is in motion.

ROBERT EDWARD BRUNSWICK SHARP.

CERTIFICATE OF CORRECTION.

Patent No. 1,716,328.                                            Granted June 4, 1929, to

ROBERT EDWARD BRUNSWICK SHARP.

It is hereby certified that error appears in the printed specification of the above numbered patent requiring correction as follows: Page 2, line 33, beginning with "A" strike out all to and including "therethrough" in line 38 and insert instead "As shown and as ordinarily constructed the breadth of the blades is to great to allow them to be completely closed or to permit them to rotate past each other so as to reverse their inclination. The angular adjustment of the blades is restricted to a limited amount covering merely the usual range of operating conditions."; page 4, lines 69 and 70, strike out the word "entirely"; and that the said Letters Patent should be read with these corrections therein that the same may conform to the record of the case in the Patent Office.

Signed and sealed this 30th day of July, A. D. 1929.

M. J. Moore,
(Seal)                                                    Acting Commissioner of Patents.